(12) United States Patent
Goto

(10) Patent No.: US 10,840,503 B2
(45) Date of Patent: Nov. 17, 2020

(54) POSITIVE ELECTRODE MATERIAL AND LITHIUM SECONDARY BATTERY USING SAME

(71) Applicant: TOYOTA JIDOSHA KABUSHIKI KAISHA, Toyota (JP)

(72) Inventor: Ippei Goto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/125,869

(22) Filed: Sep. 10, 2018

(65) Prior Publication Data

US 2019/0097219 A1    Mar. 28, 2019

(30) Foreign Application Priority Data

Sep. 22, 2017    (JP) ................................. 2017-181966

(51) Int. Cl.
    *H01M 4/36*       (2006.01)
    *H01M 10/0525*    (2010.01)
    (Continued)

(52) U.S. Cl.
    CPC ........... *H01M 4/366* (2013.01); *H01M 4/382* (2013.01); *H01M 4/505* (2013.01); *H01M 4/525* (2013.01);
    (Continued)

(58) Field of Classification Search
    CPC ...... H01M 4/366; H01M 4/382; H01M 4/505; H01M 4/525; H01M 4/628;
    (Continued)

(56) References Cited

U.S. PATENT DOCUMENTS

2012/0034516 A1* 2/2012 Koo .................... C01G 45/1228
                                                        429/200
2015/0118563 A1    4/2015 Chen

FOREIGN PATENT DOCUMENTS

JP    2000-128539 A    5/2000
JP    2005122931 A *   5/2005
(Continued)

OTHER PUBLICATIONS

Machine translation for Terauchi, JP 2005-122931 A. (Year: 2019).*

*Primary Examiner* — Stephan J Essex
(74) *Attorney, Agent, or Firm* — Sughrue Mion, PLLC

(57) ABSTRACT

The present invention provides a positive electrode material for lithium secondary batteries, having: a positive electrode active material containing Li; and a cover disposed on the positive electrode active material, and containing Li and F, and further containing one or two or more cover elements from among Al, Ti, Zr, Ta and Nb. With a Point a as an arbitrary point of the cover in contact with the positive electrode active material, a Point c as a point on the surface of the cover at a shortest distance from the Point a, and a Point b as a midpoint between the Point a and the Point c, an analysis of the Point a, the Point b and the Point c by X-ray photoelectron spectroscopy yields a ratio of Li concentration at the Point a with respect to the Li concentration at the Point b is 1.1 or higher and lower than 10.8, and a ratio of F concentration at the Point c with respect to F concentration at the Point b is 1.1 or higher and lower than 51.1.

6 Claims, 4 Drawing Sheets

(51) Int. Cl.
*H01M 4/505* (2010.01)
*H01M 4/525* (2010.01)
*H01M 4/38* (2006.01)
*H01M 10/052* (2010.01)
*H01M 4/02* (2006.01)

(52) U.S. Cl.
CPC ...... *H01M 10/0525* (2013.01); *H01M 10/052* (2013.01); *H01M 2004/028* (2013.01)

(58) Field of Classification Search
CPC ........... H01M 10/4235; H01M 10/052; H01M 10/0525; H01M 2004/021; H01M 2004/028
See application file for complete search history.

(56) References Cited

FOREIGN PATENT DOCUMENTS

| | | | |
|---|---|---|---|
| JP | 2015-529943 A | 10/2015 | |
| JP | 2017-084673 A | 5/2017 | |
| JP | 2017-107827 A | 6/2017 | |
| WO | WO-2016116862 A1 * | 7/2016 | .......... H01M 4/0471 |

* cited by examiner

POSITIVE ELECTRODE MATERIAL AND LITHIUM SECONDARY BATTERY USING SAME

CROSS REFERENCE TO RELATED APPLICATIONS

The present application claims priority based on Japanese Patent Application No. 2017-181966, filed on Sep. 22, 2017, the entire contents whereof are incorporated in the present description by reference.

BACKGROUND OF THE DISCLOSURE

1. Field

The present invention relates to a positive electrode material and a lithium secondary battery using the positive electrode material.

2. Background

Further improvement of energy density and durability in lithium secondary batteries is being addressed as one factor of performance improvement. In this context, Japanese Laid-Open Patent Publication No. 2000-128539, Japanese Laid-Open Patent Publication No. 2015-529943, Japanese Laid-Open Patent Publication No. 2017-107827, and Japanese Laid-Open Patent Publication No. 2017-084673 disclose positive electrode materials obtained by subjecting a positive electrode active material to a surface treatment. For instance, Japanese Laid-Open Patent Publication No. 2000-128539 discloses a positive electrode material in which the surface of positive electrode active material particles is covered with a crystalline metal halide. In Japanese Laid-Open Patent Publication No. 2000-128539, coating of the surface of positive electrode active material particles with a crystalline metal halide allows suppressing for instance decomposition of an electrolyte at the positive electrode surface, and increasing cycle characteristics and storage stability at high temperature.

SUMMARY

However, studies by the inventors showed that there is still room for improvement in cases where the above technology is adopted in batteries from which both high input-output characteristic and high durability are demanded, for instance batteries for motor power mounted in vehicles. Specifically, the positive electrode material disclosed in Japanese Laid-Open Patent Publication No. 2000-128539 exhibits enhanced durability by being coated with a metal halide, although Li ion conductivity drops, as a trade-off. As a result, a problem arose in that resistance in the positive electrode increased and for example high-rate charge and discharge at 2 C or above became difficult.

It is an object of the present invention, arrived at in order to solve the above problem, to provide a positive electrode material that combines both Li ion conductivity and high durability. A related object is to provide a lithium secondary battery with excellent input-output characteristics and durability.

The present invention provides a positive electrode material for lithium secondary batteries, containing: a positive electrode active material that contains Li; and a cover disposed on the positive electrode active material, and containing essentially Li and F, and further containing one or two or more cover elements from among Al, Ti, Zr, Ta and Nb. With a Point a as an arbitrary point of the cover in contact with the positive electrode active material, a Point c as a point on the surface of the cover at a shortest distance from the Point a, and a Point b as a midpoint between the Point a and the Point c, an analysis of the Point a, the Point b and the Point c by X-ray photoelectron spectroscopy (XPS) yields a ratio of Li concentration at the Point a with respect to Li concentration at the Point b is 1.1 or higher and lower than 10.8, and a ratio of F concentration at the Point c with respect to F concentration at the Point b is 1.1 or higher and lower than 51.1.

In the positive electrode material, the concentration of fluorine at a position (Point c) on the surface of the cover is higher than at a position (Point b) in the center of the cover, in the thickness direction. As a result, oxidative decomposition of the electrolyte is suppressed, and self-discharge can be suitably reduced. Further, it becomes possible to increase the structural stability of the positive electrode active material, through suppression of leaching of the constituent elements from the positive electrode active material. In the positive electrode material, moreover, the concentration of lithium is higher at a position (Point a) of the cover in contact with the positive electrode active material than at a position (Point b) in the center of the cover, in the thickness direction. As a result, it becomes possible to increase the Li ion conductivity of the positive electrode active material and to suitably reduce the resistance of the positive electrode. Therefore, using a positive electrode material having the above configuration allows realizing a lithium secondary battery boasting an excellent balance between input-output characteristics and durability, as compared with a case where for instance there is used the positive electrode active material disclosed in Japanese Laid-Open Patent Publication No. 2000-128539.

In one embodiment of the positive electrode material disclosed herein, the cover has a Li concentration gradient such that Li concentration decreases from the side near the positive electrode active material towards the surface. As a result, intercalation/deintercalation of Li in the positive electrode active material becomes smoother, and battery resistance can be reduced yet more suitably. It becomes therefore possible to further increase high input-output characteristics.

In one embodiment of the positive electrode material disclosed herein, the cover has a F concentration gradient such that F concentration increases from the side near the positive electrode active material towards the surface. As a result, it becomes possible to reduce more suitably oxidative decomposition of an electrolyte and leaching of constituent elements from the positive electrode active material. Durability can be further enhanced as a result.

In another aspect, the present invention provides a lithium secondary battery provided with the above positive electrode material. Such a lithium secondary battery exhibits for instance low initial resistance and high durability such that battery capacity does not drop readily even when the battery is stored over long periods of time in a high-voltage state.

DETAILED DESCRIPTION OF THE PREFERRED EMBODIMENTS

Figure 1:
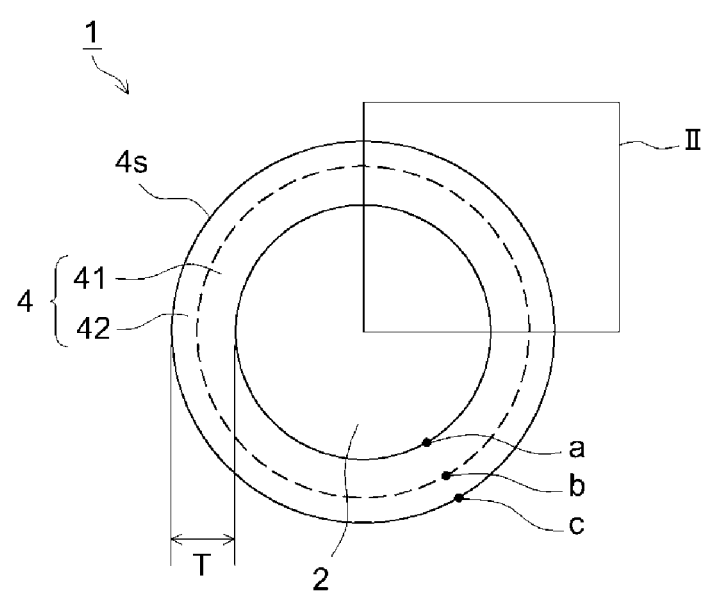
FIG. 1 is a schematic cross-sectional diagram of a positive electrode material according to an embodiment.

Preferred embodiments of the present invention will be explained below with reference to accompanying drawings. Any features (for example, further battery constituent elements and ordinary production processes of the battery, which are not characterizing features of the present invention) other than the matter specifically set forth in the present specification and that may be necessary for carrying out the present invention (for instance, composition and properties of a positive electrode material) can be regarded as design matter for a person skilled in the art based on conventional techniques in the relevant technical field. The present invention can be realized on the basis of the disclosure of the present specification and common technical knowledge in the relevant technical field. In the drawings below, members and portions that elicit identical effects are denoted with identical reference numerals, and a recurrent explanation thereof will be omitted or simplified. The dimensional relationships (length, width, thickness and so forth) in the figures do not necessarily reflect actual dimensional relationships. In the present specification a numerical value range notated as "A to B" (where A and B are arbitrary numerical values) denotes a value equal to or larger than A and equal to or smaller than B.

Positive Electrode Material

FIG. 1 is a schematic cross-sectional diagram of a positive electrode material 1 according to an embodiment. The positive electrode material 1 is a material used in a positive electrode of a lithium secondary battery. The positive electrode material 1 is in particulate form. The positive electrode material 1 has a positive electrode active material 2 that constitutes a core of the positive electrode material 1, and a cover 4 disposed on the surface of the positive electrode active material 2. Although not meant to be limited thereto, the technology disclosed herein will be explained in specific terms below with the positive electrode material 1 of FIG. 1 as an example.

The positive electrode active material 2 is a material capable of reversibly storing and releasing lithium ions that constitute charge carriers. The positive electrode active material 2 contains lithium (Li). The positive electrode active material 2 is not particularly limited. For instance, the positive electrode active material 2 is a lithium-transition metal complex oxide. The lithium-transition metal complex oxide contains Li and one or two or more transition metal elements. The lithium-transition metal complex oxide may contain one or two or more from among Ni, Co and Mn, as the transition metal element. Typical examples of lithium-transition metal complex oxide include (A) lithium-transition metal complex oxides having a layered structure; (B) lithium-transition metal complex oxides having a spinel structure; and (C) lithium-containing olivine-type phosphates. A specific explanation of the foregoing follows next.

(A) Lithium-Transition Metal Complex Oxides Having Layered Structure

In one embodiment, the positive electrode active material 2 contains a lithium-transition metal complex oxide represented by Formula (1) below.

$$Li_{1+\alpha}M^{I}O_{2+\beta}A_{\gamma} \qquad (1)$$

(In the formula, $\alpha$ is $-0.1 \leq \alpha \leq 0.5$, $\beta$ is a value (for instance $-0.5 \leq \beta \leq 0.5$) established so as to satisfy a charge neutrality condition, and $\gamma$ is $0 \leq \gamma \leq 0.2$. Further, $M^{I}$ is one or two or more elements from among Ni, Co, Al, Mn, W, Cr, Fe, V, Mg, Si, Ti, Zr, Mo, Cu, Zn, Ga, In, Sn, La, Ce, Y, Ca and Na. Further, A may be present or may be absent. When $0 < \gamma$ holds, A is one or two or more elements from among halogen elements (for instance F, Cl or Br).)

Concrete examples of the lithium-transition metal complex oxide represented by Formula (1) above include for instance lithium-nickel complex oxides containing Ni as the $M^{I}$ element, lithium-cobalt complex oxides containing Co as the $M^{I}$ element, lithium-nickel-manganese complex oxides containing Ni and Mn as the $M^{I}$ element, lithium-nickel-cobalt-manganese complex oxides containing Ni, Co and Mn as the $M^{I}$ element, lithium-nickel-cobalt-aluminum complex oxides containing Ni, Co and Al as the $M^{I}$ element, and lithium-iron-nickel-manganese complex oxides containing Fe, Ni and Mn as the $M^{I}$ element.

When $\alpha$ is $0 < \alpha$, the lithium-transition metal complex oxide represented by Formula (1) above is a so-called excess-type lithium-transition metal complex oxide. The lithium-transition metal complex oxide represented by Formula (1) above may contain Mn as the $M^{I}$ element. In a case where Mn is present as the $M^{I}$ element, Mn can leach readily from the positive electrode active material 2 as a result of repeated charge and discharge cycles and as a result of storage in a state of high voltage. It is therefore effective to utilize the technology disclosed herein.

Examples of lithium-nickel-cobalt-manganese complex oxides include for instance complex oxides represented by Formula (2).

$$Li_{1+\alpha}Ni_xCo_yMn_{(1-x-y)}M^{II}_zO_{2+\beta}A_{\gamma} \qquad (2)$$

(In the formula, $\alpha$ is $-0.1 \leq \alpha \leq 0.5$, $\beta$ is a value (for instance $-0.5 \leq \beta \leq 0.5$) established so as to satisfy a charge neutrality condition, and $\gamma$ is $0 \leq \gamma \leq 0.2$. Further, x is $0.1 \leq x \leq 0.9$, y is $0.1 \leq y \leq 0.4$ and z is $0 \leq z \leq 0.1$. Further, $M^{II}$ and A may each be present or may be absent. When $0 < z$ holds, $M^{II}$ is one or two or more elements from among Al, W, Cr, Fe, V, Mg, Si, Ti, Zr, Mo, Cu, Zn, Ga, In, Sn, La, Ce, Y, Ca and Na. When $0 < \gamma$ holds, A is one or two or more halogen elements (for instance F, Cl or Br).)

In Formula (2) above, x may be $0.1 \leq x \leq 0.4$. For instance, a complex oxide in which x, y and (1−x−y) are comparable (for instance, exhibiting a difference of 0.1 or less) has high energy density and is excellent in thermal stability. Accordingly, the effect of the technology disclosed herein can be brought about stably at a yet higher level.

(B) Lithium-Transition Metal Complex Oxide Having Spinel Structure

In another embodiment, the positive electrode active material 2 contains a lithium-transition metal complex oxide represented by Formula (3) below.

$$Li_{1+\alpha}Mn_aM^{III}_{2-a}O_{4+b}A_{\gamma} \qquad (3)$$

(In the formula, $\alpha$ is $-0.1 \leq \alpha \leq 0.5$, a is $1 \leq a \leq 2$, b is a value (for instance $-0.5 \leq b \leq 0.5$) established so as to satisfy a charge neutrality condition, and $\gamma$ is $0 \leq \gamma \leq 0.2$. Further, $M^{III}$ and A may each be present or may be absent. When $a < 2$ holds, $M^{III}$ is one or two or more elements from among Ni, Co, Al, W, Cr, Fe, V, Mg, Si, Ti, Zr, Mo, Cu, Zn, Ga, In, Sn, La, Ce, Y, Ca and Na. When $0 < \gamma$, A is one or two or more halogen elements (for instance F, Cl or Br).)

Concrete examples of the lithium-transition metal complex oxide represented by Formula (3) above include for instance lithium-manganese complex oxides not containing an $M^{III}$ element, for a=2, and lithium-nickel-manganese complex oxides containing Ni as the $M^{III}$ element.

(C) Lithium-Containing Olivine-Type Phosphate

In another embodiment, the positive electrode active material 2 contains a polyanion-type phosphate represented by Formula (4) below and/or a polyanion-type fluorophosphate represented by Formula (5) below.

$$\text{LiM}^{IV}\text{PO}_4 \tag{4}$$

(In the formula, $M^{IV}$ includes one or two or more from among transition metal elements, and can further include another metal element, a metalloid element or a non-metallic element.)

$$\text{Li}_2\text{M}^{V}\text{PO}_4\text{F} \tag{5}$$

(In the formula, $M^{V}$ includes one or two or more from among transition metal elements, and can further include another metal element, a metalloid element or a non-metallic element.)

Concrete examples of the phosphate represented by Formula (4) above include for instance $\text{LiCoPO}_4$, $\text{LiMnPO}_4$ and $\text{LiFePO}_4$. Concrete examples of the fluorophosphate represented by Formula (5) above include for instance $\text{LiMnPO}_4\text{F}$ or the like.

The average particle size of the positive electrode active material 2 is not particularly limited, but may be about 0.1 µm or greater, and typically 1 µm or greater, and for instance 5 µm or greater, taking into consideration for instance handleability and workability during formation of the cover 4. The average particle size of the positive electrode active material 2 may be about 30 µm or smaller, typically 20 µm or smaller, or for instance 10 µm or smaller, from the viewpoint of forming a dense and uniform positive electrode. The term "average particle size" in the present application denotes a particle size corresponding to a cumulative 50%, from the small particle size side, in a volume-basis particle size distribution obtained from a particle size distribution measurement based on a laser diffraction-light scattering method.

Problems such as those described above occur readily in a case where the positive electrode active material 2 has an operating potential of 4.3 V or higher, for instance 4.5 V or higher, with respect to lithium metal. That is, oxidative decomposition of an electrolyte progresses readily as a result of repeated charge and discharge cycles and/or as a result of storage in a high-voltage state. Moreover, the transition metal element leaches readily from the positive electrode active material 2. Therefore, it is effective to utilize the technology disclosed herein.

The cover 4 has the function of improving the durability of the positive electrode active material 2. The cover 4 has Li ion conductivity. The cover 4 contains at least three elements, namely lithium (Li) and fluorine (F) as essential elements, and furthermore one or two or more cover elements from among aluminum (Al), titanium (Ti), zirconia (Zr), tantalum (Ta) and niobium (Nb). The cover element is a metal element that forms readily a passive film. By virtue of containing a cover element, the cover 4 is present stably also in contact with the electrolyte. By containing the cover element, the cover 4 is not altered readily for instance even upon repeated charge and discharge cycles or during storage in a high-voltage state.

In the cover 4, Li may be in the form of a lithium complex oxide having one of the above cover elements as a constituent element. Concrete examples of such a lithium complex oxide include compounds represented by Formula (6).

$$\text{Li}_c\text{M}^{VI}_d\text{O}_e \tag{6}$$

(In the formula, c is $0.1 \leq c \leq 1.1$, d is $0.9 \leq d \leq 1.1$ and e is $1.3 \leq e \leq 2.2$. Further, $M^{VI}$ is one or two or more elements from among Al, Ti, Zr, Ta and Nb.)

In the cover 4, F may be in the form of a metal fluoride having one of the above cover elements as a constituent element. Concrete examples of metal fluorides include compounds represented by Formula (7).

$$\text{M}^{VII}_f\text{O}_g\text{F}_h \tag{7}$$

(In the formula, f is $0.9 \leq f \leq 1.1$, g is $0 \leq g \leq 1.5$, and h is $0.3 \leq h \leq 3.3$. Further, $M^{VII}$ is one or two or more elements from among Al, Ti, Zr, Ta and Nb.)

The cover 4 may be made up of the above three elements, i.e. Li, F and a cover element, and may further contain added elements so long as the effect of the technology disclosed herein is not significantly impaired thereby. Examples of added elements include for instance transition metal elements, and other metal elements and metalloid elements. Specific examples include for instance Na, Mg, Ca, Si, P, V, Cr, Mn, Fe, Co, Ni, Cu, Zn, Ga, Mo, In, Sn, W, La, Ce, Y and the like.

The Li concentration in the cover 4 may differ between a position in contact with the positive electrode active material 2 and a position at the surface 4s. Specifically, the Li concentration at the position in contact with the positive electrode active material 2 may be higher than the Li concentration at the position at the surface 4s. The cover 4 may have a Li concentration gradient whereby the Li concentration decreases gradually or stepwise from the surface in contact with the positive electrode active material 2 towards the surface 4s. Also the F concentration in the cover 4 may differ between a position in contact with the positive electrode active material 2 and a position at the surface 4s. Specifically, the F concentration at a position at the surface 4s may be higher than the F concentration at a position in contact with the positive electrode active material 2. The cover 4 may have a F concentration gradient whereby the F concentration increases gradually or stepwise from the surface in contact with the positive electrode active material 2 towards the surface 4s.

When bisected in the thickness direction, from the surface in contact with the positive electrode active material 2 towards the surface 4s, the cover 4 may be divided into a lower layer portion 41 relatively closer to the positive electrode active material 2 and into an upper layer portion 42 relatively closer to the surface 4s, as illustrated in FIG. 1.

The lower layer portion 41 may contain a lithium complex oxide such as the one represented by Formula (6) above. The lower layer portion 41 may contain a metal fluoride represented by Formula (7) above, for instance at a concentration lower than in the upper layer portion 42. The lower layer portion 41 may have a Li concentration gradient whereby the Li concentration decreases continuously or stepwise from the surface in contact with the positive electrode active material 2 towards the surface in contact with the upper layer portion 42 (i.e. towards the middle of the cover 4 in the thickness direction). The lower layer portion 41 is typically a region of overall higher Li concentration than at an intermediate position of the cover 4 in the thickness direction. The average Li concentration in the lower layer portion 41 as a whole may be higher than the average Li concentration of the upper layer portion 42.

The upper layer portion 42 may contain a metal fluoride such as the one represented by Formula (7) above. The upper layer portion 42 may contain a lithium complex oxide represented by Formula (6) above, for instance at a lower concentration than in the lower layer portion 41. The upper layer portion 42 may have a F concentration gradient such that the F concentration increases continuously or stepwise from the surface in contact with the lower layer portion 41 (i.e. from the middle of the cover 4 in the thickness direction) towards the surface 4s. The upper layer portion 42 is typically a region of overall higher F concentration than at an intermediate position of the cover 4 in the thickness direction. Typically the average of the F concentration in the upper layer portion 42 as a whole may be higher than the average F concentration in the lower layer portion 41.

The cover 4 of the present embodiment satisfies both conditions below:

$1.1 \leq (Li(a)/Li(b)) < 10.8$; and (Condition I)

$1.1 \leq (F(c)/F(b)) < 51.1$. (Condition II)

With the Point a as the point in contact with the positive electrode active material 2, the Point c as the point of the surface 4s of the cover 4 at a shortest distance from the Point a, and the Point b as the midpoint between the Point a and the Point c, then Li(a) denotes Li concentration at the Point a, Li(b) denotes Li concentration at the Point b, F(c) denotes F concentration at the Point c, and F(b) denotes F concentration at the Point b. Further, Li(a)/Li(b) is the ratio of the Li concentration at the Point a with respect to the Li concentration at the Point b. The higher the value of Li(a)/Li(b), the greater is lithium (Li) enriching at a position in contact with the positive electrode active material 2. Further, F(c)/F(b) is the ratio of the F concentration at the Point c with respect to the F concentration at the Point b. The higher the value of F(c)/F(b), the greater is fluorine (F) enrichment at the surface 4s of the cover 4. Element concentrations at respective points can be measured by X-ray photoelectron spectroscopy (XPS). The units of element concentration are for instance mol.

By satisfying both (Condition I) and (Condition II) above, the positive electrode material 1 combines Li ion conductivity and high durability. Specifically, by satisfying (Condition I), the positive electrode material 1 exhibits better Li ion conductivity than in the case of where (Condition I) is not satisfied. Accordingly, the resistance of the positive electrode can be reduced through the use of the positive electrode material 1. Herein Li(a)/Li(b) may be for instance 1.11 or higher, 2 or higher, 2.67 or higher, or 3 or higher, and may be for instance 10 or lower, 9.81 or lower, 8.15 or lower, or 3.42 or lower. By satisfying (Condition II), side reactivity can be suppressed in the positive electrode material 1 to a greater extent than when (Condition II) is not satisfied. As a result, oxidative decomposition of the electrolyte is suppressed, and self-discharge can be reduced. Further, it becomes possible to increase the structural stability of the positive electrode active material 2, through suppression of leaching of constituent elements from the positive electrode active material 2. Herein F(c)/F(b) may be for instance 1.12 or higher, 1.34 or higher, 1.5 or higher, or 1.7 or higher, and may be for instance 50 or lower, 48.22 or lower, or 10.15 or lower.

The Li concentration at the Point a, i.e. the absolute value of Li(a), is not particularly limited, and may be about 0.01 to 5 mol, typically 0.1 to 1 mol, for instance 0.5 to 1 mol. The effect of the technology disclosed herein can be brought about stably thereby at a yet higher level. The F concentration at the Point c, i.e. the absolute value of F(c), is not particularly limited, and may be about 0.001 to 10 mol, typically 0.01 to 3 mol, for instance 0.01 to 1 mol. The effect of the technology disclosed herein can be brought about stably thereby at a yet higher level.

The surface coverage of the positive electrode active material 2 by the cover 4 is not particularly limited. From the viewpoint of bringing about eliciting the durability-enhancing effect at a yet higher level, about 40% or more, typically 50% or more, and for instance 60% or more of the entire surface of the positive electrode active material 2 may be covered by the cover 4. From the viewpoint of enhancing Li ion conductivity, about 95% or less, typically 90% or less and for instance 80% or less of the entire surface of the positive electrode active material 2 may be covered by the cover 4. In the present specification the term "surface coverage of the positive electrode active material 2" denotes the proportion (atomic %) of the cover element with respect to 100 atomic % as the total of cover metal plus metals and metalloid elements other than Li and that make up the positive electrode active material 2, based on elemental analysis, by XPS, of the surface of the cover 4 in contact with the positive electrode active material 2.

The thickness T of the cover 4 varies for instance depending on the porosity and the surface coverage of the cover 4, and accordingly is not particularly limited. From the viewpoint of bringing about the durability-enhancing effect at a yet higher level, the thickness T of the cover 4 may be about 0.1 nm or greater, typically 0.5 nm or greater, and for instance 1 nm or greater. In terms of enhancing Li ion conductivity, the thickness T of the cover 4 may be about 100 nm or smaller, typically 50 nm or smaller, for example 20 nm or smaller, and for instance 10 nm or smaller. In the present specification the term "thickness T of the cover 4" denotes the depth at which the concentration of the cover element is 50% with respect to 100% as the maximum value of concentration of the cover element, in an XPS analysis in the depth direction.

The average particle size (secondary particle size) of the positive electrode material 1 is not particularly limited, but may be about 0.1 μm or greater, typically 1 μm or greater and for instance 5 μm or greater, in terms of handleability and workability during the production of the positive electrode. The average particle size may be about 30 μm or smaller, typically 20 μm or smaller, or for instance a 10 μm or smaller, from the viewpoint of forming a dense and uniform positive electrode.

Method for Producing the Positive Electrode Material

Figure 2:
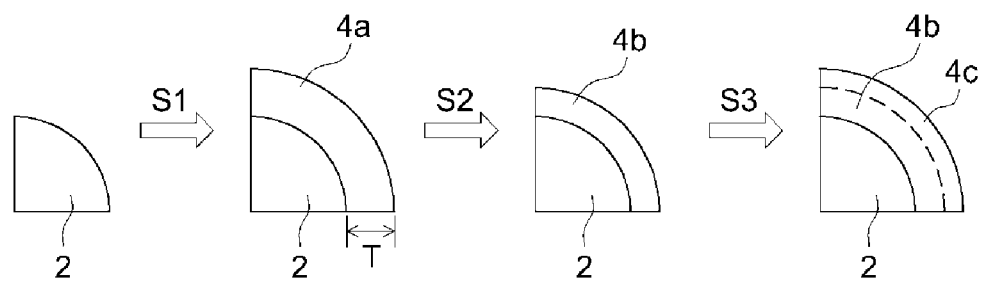
FIG. 2 is a schematic diagram illustrating an example of a production method of a positive electrode material.

FIG. 2 is a schematic diagram illustrating an example of the production method of the positive electrode material 1. The production method of FIG. 2 contains the following steps: (step S0) preparing a positive electrode active material 2 containing Li; (step S1) forming the metal layer 4a containing the cover element, on the surface of the prepared positive electrode active material 2; (step S2) forming a Li enriched layer 4b on the metal layer 4a, by performing a thermal treatment on the positive electrode active material 2 with the metal layer 4a; and (step S3) performing a fluorination treatment on the positive electrode active material 2 with the Li enriched layer 4b, to thereby form a F enriched layer 4c on the metal layer 4a. The steps will be explained next in order.

(Step S0) Preparation of the Positive Electrode Active Material 2

A positive electrode active material 2 containing Li is prepared in the present step. The positive electrode active material 2 can be procured as a commercially available product, or can be produced in accordance with a conventionally known method. As an example, a lithium-transition metal complex oxide such as the above is prepared as the positive electrode active material 2. The lithium-transition metal complex oxide may be for instance pulverized as appropriate, to yield the above average particle size.

(Step S1) Formation of the Metal Layer 4a

In the present step the surface of the positive electrode active material 2 prepared in the step S0 is covered with one or two or more cover elements selected from among Al, Ti, Zr, Ta and Nb. For instance sputtering, vacuum deposition, electroless plating or the like can be appropriately resorted to as the method for covering the surface of the positive electrode active material 2 with the cover element. In the case for instance of sputtering, the surface of particles of the positive electrode active material 2 may be sputtered evenly while the particles are caused to rotate using one or two or more types of sputtering target from among Al, Ti, Zr, Ta and Nb as a sputtering target. The film formation rate during sputtering may be set for instance to about 0.01 to 1 nm/h. As a result, there is formed the metal layer 4a containing the cover element, for instance to a thickness T, on the surface of the positive electrode active material 2.

(Step S2) Formation of the Li Enriched Layer 4b

In the present step a positive electrode active material 2 with the metal layer 4a produced in the step S1 is subjected to a thermal treatment. Thereupon, Li contained in the positive electrode active material 2 diffuses gradually into the metal layer 4a. Diffusion of Li into the metal layer 4a takes place from the side near the positive electrode active material 2. The thermal treatment atmosphere may be set for instance to an air atmosphere or to an inert gas atmosphere (for instance a $N_2$ atmosphere). The thermal treatment temperature and the thermal treatment duration are important parameters that affect the Li concentration in the metal layer 4a. The thermal treatment temperature is not particularly limited, and may be for instance set to about the melting point (180° C.) of lithium or higher, typically to 200° C. or higher, and for instance to 250° C. or higher, from the viewpoint of shortening the duration of the thermal treatment. The thermal treatment temperature may be set to about 500° C. or lower, typically 400° C. or lower, and for instance 350° C. or lower, from the viewpoint of preventing diffusion of the cover element into the positive electrode active material 2. The thermal treatment duration is not particularly limited, and may be set to about 0.5 to 48 hours, for instance 1 to 24 hours. As a result, there is formed the Li enriched layer 4b at least at a position, of the metal layer 4a, in contact with the positive electrode active material 2.

(Step S3) Formation of the F Enriched Layer 4c

In the present step the positive electrode active material 2 with Li enriched layer 4b produced in the step S2 is subjected to a fluorination treatment by being brought into contact with a fluorine source. Thereupon, F contained in the fluorine source is replaced with oxygen (O) contained for instance in the metal layer 4a, and diffuses into the metal layer 4a, from the surface side thereof. For instance, an aqueous solution method or a gas reaction method can be resorted to as the method for bringing the fluorine source and the positive electrode active material 2 into contact. For instance, a fluorine-containing compound such a hydrofluoric acid or ammonium fluoride or a fluorine-based gas such as fluorine gas can be used herein as the fluorine source. In a case where an aqueous solution method is resorted to, for instance there is prepared an aqueous solution containing a fluorine-containing compound, and the prepared aqueous solution is impregnated into the positive electrode active material 2 with Li enriched layer 4b, having been produced in the step S2, in a room temperature (25±5° C.) environment. In a case where hydrofluoric acid is used, the proportion of hydrofluoric acid in the aqueous solution may be set for instance to 1 to 10 mass % with respect to the entire aqueous solution (100 mass %). In a case where a gas reaction is resorted to, for instance the positive electrode active material 2 with Li enriched layer 4b produced in the step S2 may be exposed to the fluorine-based gas, in a room temperature environment. The duration of the fluorination treatment is not particularly limited, and may be set to about 0.1 to 5 hours, for instance 0.2 to 1 hour. As a result, the F enriched layer 4c becomes formed on at least the surface of the metal layer 4a.

The positive electrode material 1 having the positive electrode active material 2 and the cover 4 disposed on the surface of the positive electrode active material 2 can be produced thus as described above.

Positive Electrode for Lithium Secondary Batteries

The positive electrode material 1 is used in a positive electrode of a lithium secondary battery. The positive electrode of the lithium secondary battery is typically provided with a positive electrode collector, and with a positive electrode active material layer containing the positive electrode material 1 and formed on the positive electrode collector. A metal foil, for instance of aluminum, can be used as the positive electrode collector. Besides the positive electrode material 1, the positive electrode active material layer can contain arbitrary components such as a conductive material, a binder, a dispersant and the like, as needed. Examples of conductive materials include for instance carbon materials such as carbon black. Examples of binders include for instance halogenated vinyl resins such as polyvinylidene fluoride (PVdF), and rubbers such as styrene-butadiene rubber (SBR).

Lithium Secondary Battery

The positive electrode is used to construct a lithium secondary battery. In the present specification the term "lithium ion secondary battery" denotes secondary batteries in general that utilize lithium ions as charge carriers, and are charged and discharged as a result of movement of charge, with lithium ions, between a positive electrode and a negative electrode. The lithium secondary battery may be for instance a nonaqueous electrolyte secondary battery, an all-solid battery, an electrical double layer capacitor, a lithium ion capacitor or the like.

The lithium secondary battery is provided with the positive electrode, a negative electrode and an electrolyte. The negative electrode may be similar to conventional negative electrodes, and is not particularly limited. The negative electrode is typically provided with a negative electrode collector, and a negative electrode active material layer formed on the negative electrode collector. A metal foil, for instance of copper, can be used as the negative electrode collector. The negative electrode active material layer contains a negative electrode active material capable of reversibly storing and releasing charge carriers. Examples of the negative electrode active material include carbon materials, for instance graphite. The negative electrode active material layer may further contain various arbitrary components besides the negative electrode active material, for instance a binder, and a thickener. Examples of binders include for instance halogenated vinyl resins such as polyvinylidene fluoride (PVdF), and rubbers such as styrene-butadiene rubber (SBR). Examples of the thickener include for instance celluloses such as carboxymethyl cellulose (CMC).

The electrolyte may be similar to conventional negative electrodes, and is not particularly limited. The electrolyte may be a nonaqueous electrolyte containing a supporting salt and a nonaqueous solvent. The electrolyte may be an electrolyte solution that is liquid at room temperature (25°

C.). The electrolyte may exhibit a gel state in terms of having flowability at room temperature (25° C.). The electrolyte may be solid at room temperature (25° C.). The supporting salt generates lithium ions that constitute charge carriers, through dissociation in the nonaqueous solvent. For instance, a fluorine-containing lithium salt such as $LiPF_6$ or $LiBF_4$ can be used as the supporting salt. Examples of the nonaqueous solvent include for instance an aprotic solvent such as a carbonate, an ester, an ether or the like.

Figure 3:
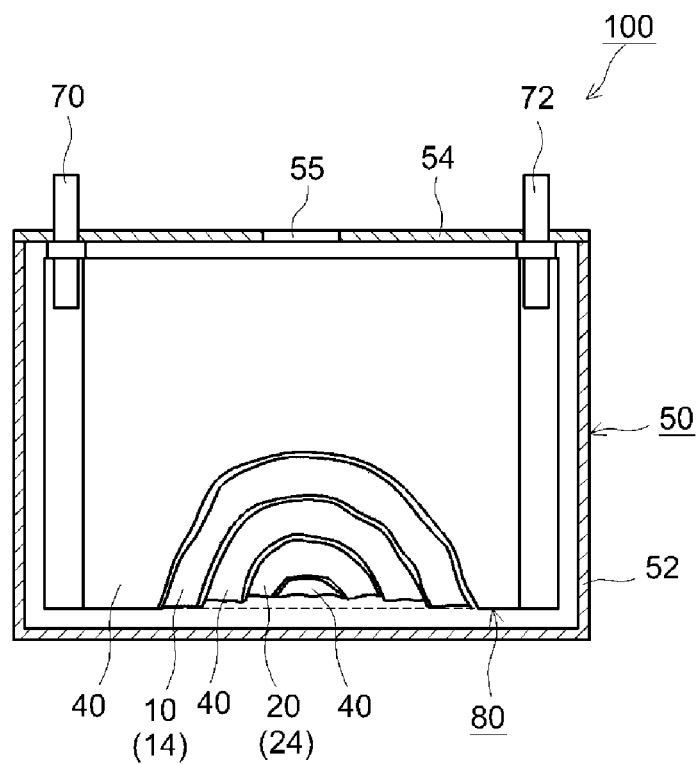
FIG. 3 is a schematic longitudinal cross-sectional diagram of a lithium secondary battery according to an embodiment.

FIG. 3 is a schematic longitudinal cross-sectional diagram of a lithium secondary battery 100 according to an embodiment. The lithium secondary battery 100 is provided with a flat wound electrode body 80, a nonaqueous electrolyte (not shown), and a flat rectangular parallelepiped battery case 50 that accommodates the foregoing.

The battery case 50 is provided with a battery case body 52 of flat rectangular parallelepiped shape having the top end open, and with a lid body 54 that plugs the opening. The material of the battery case 50 is a lightweight metal, for instance aluminum or the like. The shape of the battery case is not particularly limited, and may be a rectangular parallelepiped, a cylindrical shape or the like. A positive electrode terminal 70 and a negative electrode terminal 72 for external connection protrude at the top face, i.e. at the lid body 54 of the battery case 50. The lid body 54 is also provided with a safety valve 55 for discharging to the exterior gas generated in the interior of the battery case 50.

The wound electrode body 80 is provided with an elongated positive electrode sheet 10 and an elongated negative electrode sheet 20. The positive electrode sheet 10 is provided with an elongated positive electrode collector, and a positive electrode active material layer 14 formed on the surface of the elongated positive electrode collector, along the longitudinal direction. The positive electrode active material layer 14 is provided with the above positive electrode material 1. The positive electrode sheet 20 is provided with an elongated negative electrode collector, and a negative electrode active material layer 24 formed on the surface of the elongated negative electrode collector, along the longitudinal direction. The positive electrode sheet 10 and the negative electrode sheet 20 are insulated by a separator sheet 40. The material of the separator sheet 40 is a resin such as polyethylene (PE), polypropylene (PP), a polyester or the like. The positive electrode sheet 10 is electrically connected to the positive electrode terminal 70. The negative electrode sheet 20 is electrically connected to the negative electrode terminal 72. The wound electrode body 80 of the present embodiment has a flat shape, but can be set to have an appropriate shape, as needed, for example a cylindrical or stacked shape, depending for instance on the shape of the battery case and the intended use.

Use of the Lithium Secondary Battery

The lithium secondary battery 100 provided with the positive electrode material 1 combines excellent input-output characteristics and high durability, at a high level, as compared with conventional batteries. The lithium secondary battery 100 can be used in various applications, but can be preferably used, by exploiting such features, in applications where high input-output density and high durability are required. Such applications include for instance power sources (drive power sources) for motors that are mounted in vehicles. The type of vehicle is not particularly limited, and typical examples thereof include for instance plug-in hybrid automobiles (PHV), hybrid vehicles (HV), electric vehicles (EV) and the like. The lithium secondary battery 100 is typically used in the form of an assembled battery resulting from connection of a plurality of batteries in series and/or parallel.

Examples pertaining to the present invention will be explained next, but the present invention is not meant to be limited by the examples in any way.

I. Positive Electrode Active Material: $LiNi_{0.33}Co_{0.33}Mn_{0.33}O_2$

Comparative Example 1

A particulate lithium-nickel-cobalt-manganese complex oxide (layered structure: $LiNi_{0.33}Co_{0.33}Mn_{0.33}O_2$) having an average particle size of 10 μm was prepared as a positive electrode active material and was used, as it was (without cover), as a positive electrode material.

Example 1

Firstly a particulate lithium-nickel-cobalt-manganese complex oxide (layered structure; $LiNi_{0.33}Co_{0.33}Mn_{0.33}O_2$) having an average particle size of 10 μm was prepared as a positive electrode active material (step S0). A sputtering target of Al was used next to sputter Al onto the surface of the positive electrode active material particles, while the positive electrode active material particles were being rotated. Herein DC current was used for sputtering, and the film formation rate was set to 0.1 nm/h. As a result, an Al layer was formed on the surface of the positive electrode active material particles (step S1). Next the positive electrode active material particles with Al layer were thermally treated at 300° C. for 12 hours. As a result, Li was caused to diffuse into the Al layer, to thereby form a Li enriched layer (step S2). Next a 5 mass % hydrofluoric acid aqueous solution was prepared, and the positive electrode active material particles with Li enriched layer were subjected to a fluorination treatment by being impregnated for 0.5 hours with the hydrofluoric acid aqueous solution. As a result a F enriched layer was formed in the Al layer (step S3). A positive electrode material provided with a positive electrode active material and a cover was thus produced as a result.

Examples 2 and 3, Comparative Examples 2 to 6

In Comparative example 2 a positive electrode material was obtained in the same way as in Example 1, but herein the duration of the thermal treatment in the step S2 was shortened and the duration of the fluorination treatment in the step S3 was likewise shortened. In Comparative example 3 a positive electrode material was obtained in the same way as in Example 1, but herein the duration of the fluorination treatment in the step S3 was shortened. In Comparative example 4 a positive electrode material was obtained in the same way as in Example 1, but herein the duration of the thermal treatment in the step S2 was shortened. In Example 2 a positive electrode material was obtained in the same way as in Example 1, but herein the duration of the thermal treatment in the step S2 was lengthened. In Comparative example 5 a positive electrode material was obtained in the same way as in Example 2, but herein the duration of the thermal treatment in the step S2 was further lengthened. In Example 3 a positive electrode material was obtained in the same way as in Example 1, but herein the duration of the fluorination treatment in the step S3 was lengthened. In Comparative example 6 a positive electrode material was obtained in the same way as in Example 3, but herein the duration of the fluorination treatment in the step S3 was further lengthened.

Examples 4 to 10

In Examples 4 to 6 respective positive electrode materials were obtained in the same way as in Example 1, but modifying herein the sputtering time and the Al coverage of the step S1. In Examples 7 to 10 positive electrode materials were obtained in the same way as in Example 1 but herein Ti, Zr, Nb and Ta were used as a sputtering target, respectively, instead of Al in the step S1.

Evaluation of the Positive Electrode Material by XPS.

The thickness (nm) of the cover of the obtained positive electrode materials, and the coverage (atomic %) of the positive electrode active material surface were measured by XPS. The coverage was calculated on the basis of the following expression, with a coverage element being X: element ratio of X/(element ratio of X+element ratio of Ni+element ratio of Mn+element ratio of Co)×100. The results are given in Table 1.

Figure 4:
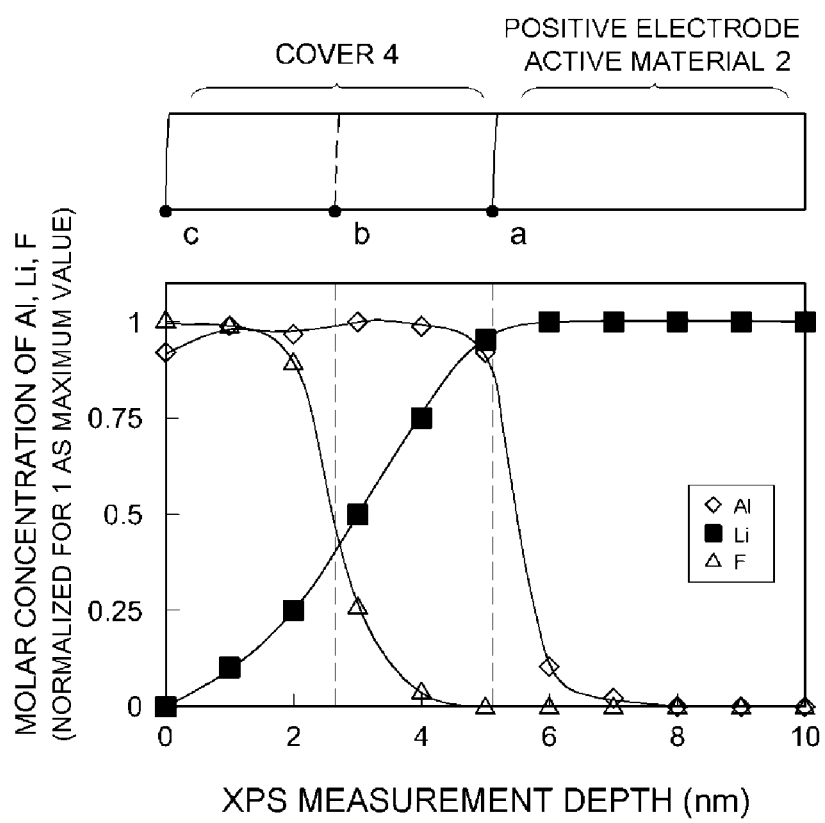
FIG. 4 is a chart illustrating results of analysis by XPS, in the depth direction, according to Example 1.

Each obtained positive electrode material was analyzed by XPS for the Point a in contact with the positive electrode active material, the Point c at the surface of the cover, and the Point b between the Point a and the Point c. As an example, FIG. 4 illustrates results of analysis by XPS in the depth direction according to Example 1. A ratio (Li(a)/Li(b)) of the Li concentration at the Point a with respect to the Li concentration at the Point b, and a ratio (F(c)/F(b)) of the F concentration at the Point c with respect to the F concentration at the Point b were calculated. The results are given in Table 1.

A comparison with Comparative example 4, Example 1, Example 2 and Comparative example 5 of Table 1 reveals that the ratio (Li(a)/Li(b)) of the Li concentration varied depending on the thermal treatment duration in the step S2. When the thermal treatment duration was shortened, specifically, the ratio of Li concentration dropped, and when the thermal treatment duration was lengthened, the ratio of Li concentration rose. A comparison between Comparative example 3, Example 1, Example 3 and Comparative example 6 of Table 1 reveals that the ratio (F(c)/F(b)) of F concentration varied depending on the fluorination treatment time in the step S3. When the fluorination treatment time was shortened, specifically the F concentration drops, and where the fluorination treatment time was lengthened, the F concentration ratio increased.

Evaluation of Battery Characteristics
Construction of Lithium Secondary Batteries Lithium secondary batteries were constructed using the obtained positive electrode materials. Specifically, firstly the positive electrode material, polyvinylidene fluoride (PVdF) as a binder and acetylene black (AB) as a conductive material were weighed to a mass ratio of 90:5:5. These materials were mixed in N-methyl-2-pyrrolidone (NMP), to a solids fraction of 55 mass %, to prepare a positive electrode slurry. The positive electrode slurry was applied onto an aluminum foil (positive electrode collector) to a basis weight of 10 mg/cm², and was dried at 120° C. As a result, there was produced a positive electrode sheet provided with a positive electrode active material layer on a positive electrode collector.

Next, natural graphite as a negative electrode active material and polyvinylidene fluoride (PVdF) as a binder were weighed to a mass ratio of 95:5. These materials were mixed in N-methyl-2-pyrrolidone (NMP), to a solids fraction of 55 mass %, to prepare a negative electrode slurry. The negative electrode slurry was applied onto a copper foil (negative electrode collector), to a basis weight of 5 mg/cm², and was dried at 120° C. As a result, a negative electrode sheet was produced that was provided with a negative electrode active material layer on a negative electrode collector.

The produced positive electrode sheet and negative electrode sheet were laid opposing each other across a separator sheet, to thereby produce an electrode body. Next a mixed solvent was prepared by mixing ethylene carbonate (EC) and dimethyl carbonate (DMC), to a volume ratio of 50:50. Then $LiPF_6$ as a supporting salt was dissolved in the mixed solvent, to a concentration of 1.0 mol/L, to prepare a nonaqueous electrolyte solution. The electrode body and the nonaqueous electrolyte solution were accommodated in a battery case made of a laminate, to construct thereby a respective lithium secondary battery.

Activation Treatment and Measurement of Initial Capacity

Each produced lithium secondary battery was charged at constant current (CC) at a rate of 1 C, up to a voltage of 4.1 V, in a temperature environment of 25° C. Next, the battery was discharged at constant current (CC), at a rate of 1 C, down to a voltage of 3 V, in a temperature environment of 25° C. This activation treatment was performed over three cycles, and the CC discharge capacity of the third cycle was taken as the initial capacity. Herein "1 C" denotes a current value for which battery capacity (Ah), predicted on the theoretical capacity of the active material, can be charged in 1 hour.

Measurement of IV Resistance

Each lithium secondary battery having undergone the above activation treatment was adjusted to a state of charge (SOC) of 55%, in a temperature environment of 25° C. The battery was CC-discharged next for 10 seconds at a discharge rate of 5 C, in a temperature environment of 25° C. A voltage change value (ΔV) over 10 seconds was divided by a discharge current value, to thereby calculate an IV resistance value. The results are given in Table 1. Table 1 sets out normalized values with respect to a reference IV resistance value (100) of the lithium secondary battery of Comparative example 1.

Measurement of Self-Discharge Capacity (High-Temperature Storage Test)

Each lithium secondary battery having undergone the above activation treatment was charged at constant current (CC) at a rate of 1 C, up to a voltage of 4.4 V, in a temperature environment of 25° C., and was thereafter charged at constant voltage (CV) until current was 1/50 C. Next, the lithium secondary battery having had the voltage adjusted to 4.4 V was kept for 7 days in a thermostatic bath at 60° C. After 7 days, the lithium secondary battery was removed from the thermostatic bath, and the battery capacity after high-temperature storage was measured in the same way the initial capacity above. The battery capacity after high-temperature storage was subtracted from the initial capacity, to thereby calculate the self-discharge capacity. The results are given in Table 1. Table 1 sets out normalized values with respect to a reference self-discharge capacity (100) of the lithium secondary battery of Comparative example 1.

TABLE 1

Positive electrode active material: $LiNi_{0.33}Co_{0.33}Mn_{0.33}O_2$

| No. | Cover element | Thickness (nm) | Coverage (%) | Li(a)/Li(b) (mol/mol) | F(c)/F(b) (mol/mol) | IV resistance (Relative value) | Self-discharge (Relative value) |
|---|---|---|---|---|---|---|---|
| Comp. ex. 1 | — | — | — | — | — | 100 | 100 |
| Comp. ex. 2 | Al | 5 | 71.2 | 1.01 | 1.08 | 198 | 91 |
| Comp. ex. 3 | Al | 5 | 70.2 | 3.12 | 1.07 | 92 | 101 |
| Comp. ex. 4 | Al | 5 | 68.4 | 1.03 | 2.12 | 152 | 54 |
| Ex. 1 | Al | 5 | 71.0 | 2.67 | 1.71 | 76 | 50 |
| Ex. 2 | Al | 5 | 72.1 | 8.15 | 1.88 | 79 | 52 |
| Comp. ex. 5 | Al | 5 | 73.5 | 10.81 | 1.57 | 131 | 52 |
| Ex. 3 | Al | 5 | 69.1 | 3.14 | 10.15 | 76 | 60 |
| Comp. ex. 6 | Al | 5 | 68.5 | 2.25 | 51.15 | 81 | 99 |
| Ex. 4 | Al | 1 | 50.1 | 1.11 | 1.12 | 69 | 60 |
| Ex. 5 | Al | 2 | 58.8 | 1.91 | 1.34 | 71 | 55 |
| Ex. 6 | Al | 10 | 90.0 | 9.81 | 48.22 | 85 | 48 |
| Ex. 7 | Ti | 5 | 71.1 | 3.14 | 1.91 | 90 | 54 |
| Ex. 8 | Zr | 5 | 69.0 | 3.42 | 2.13 | 94 | 51 |
| Ex. 9 | Nb | 5 | 67.9 | 3.21 | 2 | 76 | 60 |
| Ex. 10 | Ta | 5 | 65.2 | 3.01 | 1.82 | 80 | 65 |

In a comparison between Comparative example 4, Example 1, Example 2, Example 6 and Comparative example 5, as Table 1 shows, values of self-discharge capacity were roughly similar, but Comparative example 4, where the ratio (Li(a)/Li(b)) of Li concentration was low, and Comparative example 5, where the ratio (Li(a)/Li(b)) of Li concentration was high, exhibited relatively higher IV resistance than that of Example 1, Example 2 and Example 6. Although the underlying reason for this is unclear, it is deemed that the Li ion conductivity of the positive electrode material in Comparative example 4 was low, and Li intercalation/deintercalation did not occur readily. Meanwhile, it is found that, in Comparative example 5, Li in the positive electrode active material diffused excessively into the Al layer. Thus, the ratio of Li concentration satisfied the following expression 1.1 (Li(a)/Li(b))<10.8 and Li ion conductivity of the positive electrode material improved as a result.

A comparison between Comparative example 3, Example 1, Example 3, Example 6 and Comparative example 6 shows that in Comparative example 3, where the ratio (F(c)/F(b)) of F concentration was low and in Comparative example 6, where the ratio (F(c)/F(b)) of F concentration was high, exhibited relatively higher self-discharge capacity than those of Example 1, Example 3 and Example 6. Also IV resistance exhibited a similar tendency. Although the underlying reason for this is unclear, it is deemed that in Comparative example 3 the covering effect is insufficient, and thus there increases oxidative decomposition of the electrolyte and leaching of constituent elements from the positive electrode active material. Meanwhile, it is found that in Comparative example 6 interactions between fluorine and Li at the surface of the positive electrode material increased, with a reduction in diffusibility (mobility) of Li. The durability of the positive electrode material improved thus by virtue of the fact that the ratio of F concentration satisfied $1.1 \leq (F(c)/F(b)) < 51.1$.

Also in Examples 4 to 6, in which the thickness of the cover was caused to vary between 1 and 10 nm, and Examples 7 to 10, in which the cover element was modified, an effect of enhancing both the Li ion conductivity and the durability of the positive electrode material was obtained by virtue of the fact that the cover satisfied the above range of ratio of Li concentration and the above range of ratio of F concentration.

II. Positive Electrode Active Material: $LiNi_{0.5}Mn_{1.5}O_4$

Comparative Example 8

A particulate lithium-nickel-manganese complex oxide ($LiNi_{0.5}Mn_{1.5}O_4$) having an average particle size of 10 μm was prepared as a positive electrode active material and was used as it was (without cover) as a positive electrode material.

Example 11

A positive electrode material was obtained in the same way as in Example 1, but modifying herein the positive electrode active material to $LiNi_{0.5}Mn_{1.5}O_4$. The positive electrode material was evaluated by XPS and battery characteristics were evaluated as in I. above. The results are given in Table 2.

TABLE 2

Positive electrode active material: $LiNi_{0.5}Mn_{1.5}O_4$

| No. | Cover element | Thickness (nm) | Coverage (%) | Li(a)/Li(b) (mol/mol) | F(c)/F(b) (mol/mol) | IV resistance (Relative value) | Self-discharge (Relative value) |
|---|---|---|---|---|---|---|---|
| Comp. ex. 8 | — | — | — | — | — | 100 | 100 |
| Ex. 11 | Al | 5 | 70 | 2.67 | 1.71 | 76 | 50 |

As Example 11 in Table 2 shows, an effect of enhancing both Li ion conductivity and durability in the positive electrode material was achieved by virtue of the fact that the cover satisfied the range of ratio of Li concentration and the range of ratio of F concentration, even when the type of the positive electrode active material was modified.

Concrete examples of the technology disclosed herein have been explained above in detail, but the concrete examples are illustrative in nature and are not meant to limit the scope of the claims in any way. The technology set forth in the claims includes variations and modifications of the concrete examples illustrated above.

The terms and expressions used herein are for description only and are not to be interpreted in a limited sense. These terms and expressions should be recognized as not excluding any equivalents to the elements shown and described herein and as allowing any modification encompassed in the scope of the claims. The preferred embodiments disclosed herein may be embodied in many various forms. This disclosure should be regarded as providing preferred embodiments of the principle of the invention. These preferred embodiments are provided with the understanding that they are not intended to limit the invention to the preferred embodiments described in the specification and/or shown in the drawings. The invention is not limited to the preferred embodiment described herein. The invention disclosed herein encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

What is claimed is:

1. A positive electrode material for lithium secondary batteries, comprising:

a positive electrode active material containing Li; and a cover disposed on the positive electrode active material, and the cover containing Li and F, and further containing one or two or more cover elements from among Al, Ti, Zr, Ta and Nb, wherein with a Point a as an arbitrary point of the cover in contact with the positive electrode active material, a Point c as a point on the surface of the cover at a shortest distance from the Point a, and a Point b as a midpoint between the Point a and the Point c, then an analysis of the Point a, the Point b and the Point c by X-ray photoelectron spectroscopy (XPS) yields a ratio of Li concentration at the Point a with respect to Li concentration at the Point b is 1.1 or higher and lower than 10.8, and a ratio of F concentration at the Point c with respect to F concentration at the Point b is 1.1 or higher and lower than 51.1.

2. The positive electrode material according to claim 1, wherein the cover has a Li concentration gradient such that Li concentration decreases from a side near the positive electrode active material towards the surface.

3. The positive electrode material according to claim 1, wherein the cover has a F concentration gradient such that F concentration increases from a side near the positive electrode active material towards the surface.

4. A lithium secondary battery, comprising the positive electrode material of claim 1.

5. The positive electrode material according to claim 1, wherein the Li is contained in the cover in the form of a lithium complex oxide having lithium element, at least one of the cover elements, and oxygen element.

6. The positive electrode material according to claim 1, wherein the F is contained in the cover in the form of a metal fluoride having at least one of the cover elements, oxygen element, and fluorine element.

* * * * *